(12) United States Patent
Kim et al.

(10) Patent No.: US 10,811,687 B2
(45) Date of Patent: Oct. 20, 2020

(54) ELECTRODE WITH IMPROVED ADHESION PROPERTY FOR LITHIUM SECONDARY BATTERY, AND MANUFACTURING METHOD THEREOF

(71) Applicant: LG Chem, Ltd., Seoul (KR)

(72) Inventors: Hyun Min Kim, Daejeon (KR); Hee Seok Jeong, Daejeon (KR); Ju Ri Kim, Daejeon (KR); Sei Woon Oh, Daejeon (KR)

(73) Assignee: LG Chem, Ltd. (KR)

( * ) Notice: Subject to any disclaimer, the term of this patent is extended or adjusted under 35 U.S.C. 154(b) by 247 days.

(21) Appl. No.: 15/759,725

(22) PCT Filed: Nov. 23, 2016

(86) PCT No.: PCT/KR2016/013513
§ 371 (c)(1),
(2) Date: Mar. 13, 2018

(87) PCT Pub. No.: WO2017/104996
PCT Pub. Date: Jun. 22, 2017

(65) Prior Publication Data
US 2018/0261844 A1 Sep. 13, 2018

(30) Foreign Application Priority Data

Nov. 23, 2015 (KR) .................. 10-2015-0163882

(51) Int. Cl.
*H01M 4/62* (2006.01)
*H01M 4/133* (2010.01)
(Continued)

(52) U.S. Cl.
CPC ......... *H01M 4/622* (2013.01); *H01M 4/0404* (2013.01); *H01M 4/0435* (2013.01);
(Continued)

(58) Field of Classification Search
CPC .. H01M 4/622; H01M 4/0404; H01M 4/0435; H01M 4/13; H01M 4/133;
(Continued)

(56) References Cited

U.S. PATENT DOCUMENTS

| 6,537,468 B1 | 3/2003 | Hata et al. |
| 2005/0095504 A1 | 5/2005 | Kim et al. |

(Continued)

FOREIGN PATENT DOCUMENTS

| EP | 1090956 A1 | 4/2001 |
| JP | 2002289174 A | 10/2002 |

(Continued)

OTHER PUBLICATIONS

Supplementary European Search Report for EP16875938 dated Jun. 1, 2018.

(Continued)

*Primary Examiner* — Jimmy Vo
(74) *Attorney, Agent, or Firm* — Lerner, David, Littenberg, Krumholz & Mentlik, LLP

(57) ABSTRACT

The present invention relates to a secondary battery electrode including: a collector positioned between an external wire and an electrode active material to transfer electrons; and an electrode mixture layer coated on the collector, wherein the electrode mixture layer includes a cross-linked polymer, an electrode active material, and a binder, and the cross-linked polymer is formed by a cross-linked bond between a first polymerization unit and a second polymerization unit to have an interpenetrating polymer network (IPN), and a manufacturing method thereof.

10 Claims, 2 Drawing Sheets

(51) Int. Cl.
*H01M 4/139* (2010.01)
*H01M 4/13* (2010.01)
*H01M 10/052* (2010.01)
*H01M 4/1393* (2010.01)
*H01M 4/04* (2006.01)
*H01M 10/0525* (2010.01)
*H01M 4/02* (2006.01)

(52) U.S. Cl.
CPC ............ *H01M 4/13* (2013.01); *H01M 4/133* (2013.01); *H01M 4/139* (2013.01); *H01M 4/1393* (2013.01); *H01M 10/052* (2013.01); *H01M 10/0525* (2013.01); *H01M 2004/027* (2013.01)

(58) Field of Classification Search
CPC .. H01M 4/139; H01M 4/1393; H01M 10/052; H01M 10/0525
See application file for complete search history.

(56) References Cited

U.S. PATENT DOCUMENTS

| | | | |
|---|---|---|---|
| 2009/0136845 A1 | 5/2009 | Choi et al. | |
| 2010/0047693 A1 | 2/2010 | Yang et al. | |
| 2012/0153219 A1 | 6/2012 | Zhang et al. | |
| 2013/0236790 A1* | 9/2013 | Byun | H01M 4/505 |
| | | | 429/224 |
| 2014/0205899 A1* | 7/2014 | Chung | H01M 4/133 |
| | | | 429/211 |
| 2015/0010816 A1 | 1/2015 | Chung et al. | |
| 2016/0204439 A1 | 7/2016 | Sonobe | |

FOREIGN PATENT DOCUMENTS

| | | |
|---|---|---|
| JP | 2005142156 A | 6/2005 |
| JP | 2009135103 A | 6/2009 |
| JP | 5198231 B2 | 5/2013 |
| KR | 20080017113 A | 2/2008 |
| KR | 100898705 B1 | 5/2009 |
| KR | 20090055307 A | 6/2009 |
| KR | 20130134909 A | 12/2013 |
| KR | 20140145450 A | 12/2014 |
| KR | 20150006265 A | 1/2015 |
| KR | 20150071792 A | 6/2015 |
| WO | 2000056815 A1 | 9/2000 |
| WO | 2014188724 A1 | 11/2014 |

OTHER PUBLICATIONS

International Search Report dated Apr. 26, 2017 for PCT/KR2016/013513 (2 pages, with English Translation).
Kayaman-Apohan et al., "UV-curable interpenetrating polymer networks based on acrylate/vinylether functionalized urethane oligomers," Radiation Physics and Chemistry, 73 (Aug. 2005) pp. 254-262.

* cited by examiner

ELECTRODE WITH IMPROVED ADHESION PROPERTY FOR LITHIUM SECONDARY BATTERY, AND MANUFACTURING METHOD THEREOF

CROSS-REFERENCE TO RELATED APPLICATIONS

The present application is a national phase entry under 35 U.S.C. § 371 of International Application No. PCT/KR2016/013513 filed Nov. 23, 2016, published in Korean, which claims priority from Korea Patent Application No. 10-2015-0163882, filed Nov. 23, 2015, all of which are incorporated herein by reference in their entirety.

The present invention relates to a lithium secondary battery electrode with an improved adhesion property, and a manufacturing method thereof.

BACKGROUND

As technology development and demand for mobile devices have increased, the demand for batteries as an energy source has been rapidly increasing, and accordingly, a lot of researches on batteries that can meet various demands have been conducted.

Typically, there is a high demand for a lithium secondary battery such as a lithium ion battery and a lithium ion polymer battery having high energy density, discharge voltage, and output stability in terms of material of a battery.

Such a lithium secondary battery is being developed as a model capable of realizing high voltage and high capacity depending on the demand of a consumer, and an optimization process of a cathode material, an anode material, a separator, and an electrolytic solution, which are four factors of the lithium secondary battery, is required in a limited space in order to have high capacity.

In general, the easiest way to achieve high capacity is to provide a large amount of electrode active material on the collector, but in this method, if a certain level of electrode adhesion property is secured, electrode deintercalation may occur during electrode coating, drying, and rolling processes, which may cause deterioration of battery performance and stability.

Accordingly, studies on a method for improving the electrode adhesion property have been actively conducted in the related art in order to manufacture a battery having excellent battery performance and stability while realizing high capacity, and a method of including a binder for improving the electrode adhesion property in an electrode has been widely used.

An electrode active material, a conductive material, and a collector constituting the electrode are solid at room temperature and have different surface characteristics, and thus are difficult to bond easily at room temperature. However, when a polymeric binder is used, a bonding force between constituent elements of the electrode is increased, and an electrode deintercalation phenomenon of the electrode can be suppressed during the electrode coating, drying, and rolling processes.

However, the binder has a relatively low density among materials constituting the electrode, and thus the binder moves together with a solvent in a direction in which the solvent is volatilized (in a direction away from the collector), to be distributed over the electrode so that an adhesive force between an electrode collector and an electrode material is weakened, in a drying process at a high temperature of 100° C. or more after coating the electrode. As a result, the battery life is shortened.

In order to solve this problem, a binder having a high molecular weight was used. However, in this case, there was a problem in the process such as a viscosity increase in slurry mixing and clogging of a feed filter. Accordingly, a method of mixing two kinds of binders has been developed. However, a clear solution has not been found to be able to exhibit a sufficient adhesion force between the electrode collector and the electrode material without any process problems.

As a result, there is a high need for a secondary battery electrode capable of improving performance of a battery by an adhesion property between the electrode collector and the electrode material and between the electrode materials, by providing excellent distribution of the binder within the electrode while having high theoretical capacity.

Technical Problem

The present invention has been made in an effort to solve the above-mentioned problems of the prior art and the technical problems from the past.

Technical Solution

The inventors of the present application conducted intensive research and various experiments and found that when an electrode mixture layer includes a cross-linked polymer having an interpenetrating polymer network, it may prevent deterioration of battery performance while realizing high battery capacity by securing adhesion properties of a collector and electrode materials by uniformly distributing binders in the electrode mixture layer.

An exemplary embodiment of the present invention provides a secondary battery electrode including: a collector positioned between an external wire and an electrode active material to transfer electrons; and an electrode mixture layer coated on the collector, wherein the electrode mixture layer includes a cross-linked polymer, an electrode active material, and a binder, and the cross-linked polymer is formed by a cross-linked bond between a first polymerization unit and a second polymerization unit to have an interpenetrating polymer network (IPN).

As described above, in a structure of the conventional electrode, a large amount of the binder rises to a surface layer of the electrode mixture layer in the electrode drying process and fails to provide sufficient adhesion between an electrode collector and electrode materials of the electrode mixture layer, thereby causing deterioration of life characteristics and other battery performance issues.

In contrast, in a structure of an electrode according to the present invention, a cross-linked polymer forms an interpenetrating polymer network structure in the electrode before the drying process so that the crosslinked polymer binds the electrode active material and the binder in the network structure and physically suppresses migration thereof, and thus the binder and the electrode active material may be uniformly distributed in the electrode even after the drying process. Accordingly, the inventors of the present application determined that a distance between a collector interface and the binder may be minimized to prevent the deterioration of the adhesion property between the electrode active material and the collector, thereby improving battery performance.

The cross-linked polymer forming the interpenetrating polymer network is contained in an amount of from 0.1 wt % to 30 wt %, specifically 0.1 wt % to 10 wt %, and more specifically 0.3 wt % to 5 wt % by weight based on a total weight of the electrode mixture layer.

When the content of the cross-linked polymer is outside of the above range and is smaller than 0.1 wt %, the cross-linked polymer is not formed so as to interfere with the transition between the electrode active material and the binder, and thus it is difficult to obtain a desired effect. When the content of the cross-linked polymer is larger than 30 wt %, although the cross-linked polymer has an electrolyte property, the content of the electrode material such as the electrode active material is relatively decreased, resulting in deterioration of the overall battery performance.

The crosslinked polymer may have an electrolyte characteristic, that is, a property such that it is capable of ionic conduction in order to not cause a problem of deterioration of battery performance due to reduction of other electrode materials due to inclusion of the cross-linked polymer as described above without causing side reactions with lithium ions, and such ionic conductivity is preferably $10^{-6}$ S/cm to $10^{-2}$ S/cm, and more specifically $10^{-6}$ S/cm to $10^{-4}$ S/cm.

When the ionic conductivity is less than $10^{-6}$ S/cm, outside of the above range, sufficient electrolyte characteristics may not be exhibited. That is, since the amount of the other electrode materials is reduced by the ratio of the cross-linked polymer in the electrode, it may lead to deterioration of the battery performance. The ionic conductivity is measured by using an electrical conductivity meter.

Further, the cross-linked polymer may exhibit solvent resistance of 5% or less with respect to water or a non-aqueous electrolytic solution. Specifically, when the polymer substance eluted in water or an organic solvent is quantitatively analyzed by 1 H-NMR or the dissolved concentration of the crosslinked polymer in the solvent is calculated by the residual mass after the solvent decomposition temperature by thermogravimetric analysis (TGA) after the manufactured electrode is immersed in a predetermined amount of water or non-aqueous electrolytic solution at room temperature for 12 hours, it may exhibit solvent resistance of 5% or less. In this case, a lower dissolution concentration indicates better solvent resistance. As such, in the case of having excellent solvent resistance, it is possible to maintain the uniform distribution of the electrode materials by preventing the cross-linked polymer from dissolving into the electrolyte in the electrode over time.

The polymerization units may be substances that have the above-mentioned properties by crosslinking in order to form a crosslinked polymer having such characteristics.

The first polymerization unit and the second polymerization unit may independently include a monomer, an oligomer, or a polymer, independently of each other, and are not limited as long as they are capable of forming an interpenetrating polymer network structure.

Specifically, the monomer may be at least one of an acrylate-based monomer, a hydroxy group-containing monomer, an amine-based monomer, a linear nitrile-based compound-derived monomer having a vinyl group, and a carboxylic acid-based monomer, the oligomer may be a urethane-based oligomer, and the polymer may be at least one of polyvinyl alcohol and polyurethane.

Any combination of the monometers may be used as long as it is a combination that can satisfy the conditions of the present invention. However, the negative electrode may include a cross-linked polymer formed by crosslinking of polyphenyl alcohol and polyurethane, crosslinking of a hydroxy group-containing monomer or an amine group monomer and a carboxylic acid monomer, crosslinking of a linear nitrile compound-derived monomer having a vinyl group and a carboxylic acid-based monomer, or crosslinking of a urethane-based oligomer. The positive electrode may include a cross-linked polymer formed by crosslinking of a urethane-based oligomer. Of course, it is within the scope of the present invention that the polymer in which the above-mentioned monomer or oligomer is polymerized is also used as a cross-linked polymerization unit.

However, the first polymerization unit and the second polymerization unit may be different urethane-based oligomers or urethane-series polymers so as to form a stable crosslinked polymer while having the ionic conductivity of the above-described electrolyte characteristics.

Specifically, the first polymerization unit may be an acryl urethane-based oligomer or polymer, and the second polymerization unit may be a vinyl ether urethane-based oligomer or polymer. More specifically, the acryl urethane-based oligomer or polymer may be a bisphenol A-based acryl urethane, or a 6F bisphenol A-based acryl urethane, and the vinyl ether urethane-based oligomer or polymer may be a siloxane-based vinyl ether urethane, or in more detail, a polydimethylsiloxane-based vinyl ether urethane.

A weight average molecular weight of the acryl urethane-based oligomer or polymer may be in a range of 100 to 500,000.

When the weight average molecular weight of each polymerization unit is too low outside of the above range, the electrode-forming slurry viscosity sharply drops. When it is too high, dissolution in a solvent for forming an electrode slurry is too low in solubility, which makes it difficult to form a uniformly distributed electrode, and a crosslinking reaction does not occur smoothly.

A mixing ratio of the first polymerization unit and the second polymerization unit which form a cross-linked polymer having the interpenetrating polymer network varies depending on a type of the polymerization unit. In this case, when the urethane-based oligomer or polymer is used, the first polymerization unit and the second polymerization unit form an IPN structure by a cross-linking reaction at a weight ratio of 5:95 to 95:5, or specifically at a weight ratio of 80:20 to 95:5.

As one example, a manufacturing method of a secondary battery electrode according to the present invention using the first polymerization unit and the second polymerization unit may include:

(i) producing an electrode slurry by mixing a first polymerization unit, a second polymerization unit, a photoinitiator, an electrode active material, and a binder in a solvent;

(ii) applying the electrode slurry to a collector;

(iii) forming an interpenetrating polymer network (IPN) by performing an ultraviolet treatment on the electrode slurry; and (iv) drying and rolling it.

FIG. 1 schematically illustrates an electrode manufacturing method according to an exemplary embodiment of the present invention in order to facilitate understanding of the formation process of the electrode, and FIG. 2 illustrates a shape of the manufactured electrode during a drying process.

First, referring to FIG. 1, an IPN structure is formed by coating an electrode slurry 101 obtained by mixing a first polymerization unit, a second polymerization unit, a photoinitiator, an electrode active material, and a binder in a solvent on an electrode collector 120, and immediately processing it by an ultraviolet treatment 130. Then, a solvent is evaporated by passing it through a drying device 140 to manufacture an electrode in which an electrode mixture layer 110 including a cross-linked polymer having an IPN structure is formed in the electrode collector 120.

Referring to FIG. 2, for the manufactured electrode, even when an electrode active material 112 of the electrode current collector 120 is highly loaded during the drying process, the electrode active material 112 and a binder 113 are prevented from being lifted up to the electrode surface farther from the electrode collector 120 by a cross-linked polymer 111 constituting an interpenetrating polymer network by the ultraviolet treatment to be uniformly distributed across the electrode so as to keep a position thereof, thereby preventing deterioration of an adhesion property between the electrode active material and the collector.

The cross-linked polymer that performs the above role is performed by cross-linking an electrode slurry including the first polymerization unit, the second polymerization unit, and the photoinitiator.

In this case, examples and their mixing ratio of the first polymerization unit and the second polymerization unit may be the same as described above, and they may be units for forming the cross-linking by an ultraviolet treatment. For example, they may be urethane-based oligomers.

The photoinitiator for initiating the cross-linking by the ultraviolet treatment is not limited as long as it performs the role of forming first polymerization unit and second polymerization unit radicals by ultraviolet treatment. For example, the photoinitiator may be at least one of benzoin ether-based, benzophenone-based, acetophenone-based, and thioxanthone-based photoinitiators.

The ultraviolet ray treatment is performed by irradiating light in the ultraviolet ray region, specifically, by ultraviolet ray irradiation for 50 to 300 seconds.

The first polymerization unit and the second polymerization unit formed by such ultraviolet treatment are polymerized to form a complete interpenetrating polymer network structure.

As one example, a manufacturing method of a secondary battery electrode may include:

(i) producing an electrode slurry by mixing a first polymerization unit, a second polymerization unit, a thermal initiator, an electrode active material, and a binder in a solvent;

(ii) applying the electrode slurry to a collector;

(iii) forming an interpenetrating polymer network (IPN) by performing a heat treatment on the electrode slurry; and (iv) drying and rolling it.

In this case, the heat treatment to form the interpenetrating polymer network structure (IPN) and the drying of the electrodes may be performed together in the same process.

The manufacturing method of such an electrode is the same as that of the heat treatment in place of the ultraviolet treatment in FIG. 1, and the resulting structure is the same as in FIG. 2. Accordingly, a detailed description thereof will be omitted.

Herein, examples and their mixing ratio of the first polymerization unit and the second polymerization unit may be the same as described above, and they may be units for easily forming the cross-linking by the heat treatment. For example, they may be two of an acrylate-based monomer, a hydroxy group-containing monomer, an amine-based monomer, a linear nitrile-based compound-derived monomer, a carboxylic acid-based monomer, polyvinyl alcohol, and polyurethane.

The thermal initiator for initiating the cross-linking by the heat treatment is not limited as long as it performs the role of forming first polymerization unit and second polymerization unit radicals by the heat treatment. For example, the photoinitiator may be at least one of an azo-based compound and a peroxide-based compound.

The heat treatment is performed at a temperature similar to or higher than that of the drying process of the electrode, and specifically, by heat treatment in a range of 80° C. to 200° C.

The first polymerization unit and the second polymerization unit form the cross-linking by a condensation reaction by using the heat treatment, thereby forming a cross-linked polymer having an interpenetrating polymer network, and thus-generated water is evaporated due to high heat during the heat treatment. When a temperature of the heat treatment is less than 80° C., the condensation reaction does not occur smoothly, which is not preferable. When the temperature of the heat treatment exceeds 200° C., the binder in the electrode may be decomposed, which is not preferable.

The method of applying, drying, rolling, and the like of the electrode slurry, can be applied without particular limitation, such as coating, drying, and rolling in an electrode manufacturing method known in the art.

The electrode of such a structure is more effective for a high loading electrode in which the life characteristic may be markedly reduced due to a structure in which an adhesive force between the electrode collector and electrode active material may be significantly reduced by the lifting of the binder, that is, a structure in which a distance between the collector and the electrode surface farther from the collector is large. For example, it may be more effective for a high loading electrode of 3 mAh/cm$^2$ to 8 mAh/cm$^2$, and particularly, 5 mAh/cm$^2$ to 8 mAh/cm$^2$.

Hereinafter, the electrode and other materials constituting the lithium secondary battery including the electrode will be described.

The electrode active material constituting an electrode in addition to the cross-linked polymer differs depending on whether the electrode is a positive electrode or a negative electrode. When the secondary battery electrode is a positive electrode, it may include, as a positive electrode active material, e.g., a layered compound such as a lithium cobalt oxide ($LiCoO_2$) or a lithium nickel oxide ($LiNiO_2$), or a compound substituted with one or more transition elements; a lithium manganese oxide such as one of a chemical formula $Li_{1+x}Mn_{2-x}O_4$ (wherein x is in a range of 0 to 0.33), $LiMnO_3$, $LiMn_2O_3$, and $LiMnO_2$; a lithium copper oxide ($Li_2CuO_2$); a vanadium oxide such as $LiV_3O_8$, $LiFe_3O_4$, $V_2O_5$, and $Cu_2V_2O_7$; a Ni-site type of lithium nickel oxide represented by a chemical formula $LiNi_{1-x}M_xO_2$ (wherein M=Co, Mn, Al, Cu, Fe, Mg, B, or Ga, and x=0.01-0.3); a lithium manganese composite oxide represented by a chemical formula $LiMn_{2-x}M_xO_2$ (wherein M=Co, Ni, Fe, Cr, Zn, or Ta, and x=0.01-0.1) or $Li_2Mn_3MO_3$ (wherein M=Fe, Co, Ni, Cu, or Zn); a lithium manganese composite oxide having a spinel structure represented by $LiNi_xMn_{2-x}O_4$; $LiMn_2O_4$ in which a part of Li in the chemical formula is substituted with an alkaline-earth metal ion; a disulfide compound; or $Fe_2(MoO_4)_3$. When the secondary battery electrode is a negative electrode, the electrode active material may include, as the negative electrode active material, e.g., a metal composite oxide such as at least one carbon-based material of crystalline artificial graphite, crystalline natural graphite, amorphous hard carbon, low crystalline soft carbon, carbon black, acetylene black, Ketjenblack, Super P, graphene, and fibrous carbon; a Si-based material; $Li_xFe_2O_3$ (0≤x≤1); $Li_xWO_2$ (0≤x≤1); $Sn_xMe_{1-x}Me'_yO_z$ (Me: Mn, Fe, Pb, Ge; Me': Al, B, P, Si, elements of Group 1, 2, and 3 of the Periodic Table, a halogen; 0<y≤1; 1≤y≤3; 1≤z≤8); a lithium metal; a lithium alloy; a silicon-based alloy; a tin-based alloy; a metal oxide such as SnO, $SnO_2$. PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; a Li—Co—Ni-based material; a titanium oxide; and a lithium titanium oxide.

The binder is not limited as long as it is a polymer exhibiting a predetermined adhesive force irrespective of whether the electrode for the secondary battery is a positive electrode or a negative electrode, and is usually added in an amount of 1 to 30% by weight based on the total weight of the electrode mixture containing the electrode active material. Examples of the binder include polyvinylidene fluoride (PVdF), polyvinyl alcohol (PVA), carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butylene rubber, fluoro rubber, and various copolymers.

The electrode mixture layer may further include a conductive material for imparting conductivity to the electrode or a filter, if necessary, as a component for suppressing expansion of the positive electrode, in addition to the cross-linked polymer, the electrode active material, and the binder.

For example, the conductive material may include graphite such as natural graphite or artificial graphite; carbon black such as carbon black, acetylene black, Ketjenblack, channel black, furnace black, or lamp black; a conductive fiber such as a carbon fiber or a metal fiber; a metal powder such as carbon fluoride, aluminum, and a nickel powder; conductive whiskers such as a zinc oxide or potassium titanate; a conductive metal oxide such as titanium oxide; or a conductive material such as a polyphenylene derivative. Specific examples of a commercially available conductive material include acetylene black series such as Chevron Chemical Company, Denka Singapore Private Limited, and Gulf Oil Company products, Ketjenblack, EC series (Armak Company), Vulcan XC-72 (Cabot Company), and Super P (Timcal Co.).

The filler is not particularly limited as long as it is a fibrous material that does not cause any chemical change in the battery. Examples of the filler include olefin polymers such as polyethylene and polypropylene, fibrous materials such as glass fibers and carbon fiber, and the like.

The electrode collector coated with the electrode mixture layer differs depending on whether the electrode is a positive electrode or a negative electrode.

The positive electrode collector is generally made to have a thickness of 3 to 500 μm. The positive electrode collector is not particularly limited as long as it has high conductivity without causing chemical change in the battery, and may be made of, e.g., stainless steel, aluminum, nickel, titanium, sintered carbon, aluminum, or stainless steel having a surface treated with carbon, nickel, titanium, or silver thereon. The collector may form fine irregularities on a surface thereof to increase the adhesive force of the positive electrode active material, and be in various forms such as a film, a sheet, a foil, a net, a porous body, and a foam.

The negative electrode collector is generally made to have a thickness of 3 to 500 μm. The negative electrode collector is not particularly limited as long as it has high conductivity without causing any chemical change in the battery, and may be made of, e.g., copper, stainless steel, aluminum, nickel, titanium, sintered carbon, or stainless steel having a surface treated with carbon, nickel, titanium, or silver thereon. Similar to the positive electrode collector, the negative electrode collector may form fine irregularities on a surface thereof to increase the adhesive force of the positive electrode active material, and various forms such as a film, a sheet, a foil, a net, a porous body, and a foam.

The present invention also provides a lithium secondary battery including the electrode for the secondary battery.

The lithium secondary battery has a structure in which a lithium salt-containing non-aqueous electrolyte is impregnated in an electrode assembly having a separator interposed between a positive electrode and a negative electrode.

The separator is an insulating thin film interposed between the positive electrode and the negative electrode and having high ion permeability and mechanical strength. A pore diameter of the separator is generally in a range of 0.01-10 μm, and a thickness thereof is generally in a range of 5-300 μm. As such a separator, for example, a sheet or a nonwoven fabric made of an olefin-based polymer such as polypropylene which is chemically resistant and hydrophobic, glass fiber, polyethylene, or the like is used.

In some cases, a gel polymer electrolyte may be coated on the separator to improve the stability of the battery. Representative examples of such a gel polymer include polyethylene oxide, polyvinylidene fluoride, polyacrylonitrile, and the like. When a solid electrolyte such as a polymer is used as the electrolyte, the solid electrolyte may also serve as a separator.

The lithium salt-containing nonaqueous electrolyte solution includes a nonaqueous electrolyte solution and a lithium salt, and nonaqueous organic solvents, organic solid electrolytes, and inorganic solid electrolytes are used as the nonaqueous electrolyte solution, but the present invention is not limited thereto.

As the non-aqueous-based organic solvent, for example, an aprotic organic solvent such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxy ethane, 1,2-diethoxy ethane, tetrahydroxy franc, 2-methyl tetrahydrofuran, dimethyl sulf oxide, 1,3-dioxolane, 4-methyl-1,3-dioxane, diethylether, formamide, dimethylformamide, dioxolane, acetonitrile, nitromethane, formic acid methyl, acetic acid methyl, phosphoric acid triester, trimethoxy methane, dioxolane derivative, sulfolane, methyl sulfolane, 1,3-dimethyl-2-imidazolidinone, a propylene carbonate derivative, a tetrahydrofuran derivative, ether, propionic acid methyl, or ethyl propionate may be used.

As the organic solid electrolyte, for example, a polyethylene derivative, a polyethylene oxide derivative, a polypropylene oxide derivative, a phosphoric acid ester polymer, a poly agitation lysine, a polyester sulfide, a polyvinyl alcohol, a polyvinylidene fluoride, or a polymer containing an ionic dissociating group may be used.

As the inorganic solid electrolyte, for example, a nitride, a halide, a sulfate, or the like such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $LiSiO_4$—LiI—LiOH, and $Li_3PO_4$—$Li_2S$—$SiS_2$ may be used.

As the lithium salt which is a substance which is soluble in the non-aqueous electrolyte, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, lithium chloroborane, lower aliphatic carbonic acid lithium, 4 phenyl boric acid lithium, or an imide may be used.

For the purpose of improving charge/discharge characteristics and flame retardancy, the lithium salt-containing non-aqueous electrolyte may be added with, for example, pyridine, triethylphosphite, triethanolamine, cyclic ether, ethylene diamine, n-glyme, hexa phosphoric acid tri amide, a nitrobenzene derivative, sulfur, quinone imine dyes, N-substituted oxazolidinones, N,N-substituted imidazolidines, ethylene glycol dialkyl ethers, ammonium salts, pyrrole, 2-methoxyethanol, or aluminum trichloride. In some cases, a halogen-containing solvent such as carbon tetrachloride or ethylene trifluoride may be further added to impart nonflammability, or a carbon dioxide gas may be further added to improve high-temperature storage characteristics.

In one example, a lithium salt-containing non-aqueous-based electrolyte may be produced by adding a lithium salt such as $LiPF_6$, $LiClO_4$, $LiBF_4$, or $LiN(SO_2CF_3)_2$ to a mixed solvent of a cyclic carbonate of EC or PC, which is a high-dielectric solvent, and a linear carbonate of DEC, DMC, or EMC, which is a low-viscosity solvent.

The present invention provides a battery module including the lithium secondary battery as a unit battery, a battery pack including the battery module, and a device including the battery pack as a power source.

Specific examples of the device include a small device such as a mobile phone, a wearable electronic device, a smart phone, a smart pad, a netbook, a laptop, and a tablet PC; a power tool powered by an electric motor; an electric vehicle such as a hybrid electric vehicle (HEV), a plug-in hybrid electric vehicle (PHEV), and an extended range electric vehicle (EREV); an electric bicycle such as an electric bicycle (E-bike) or an electric scooter (E-scooter); an electric golf cart; and a power storage system, but the present invention is limited thereto.

The structure and manufacturing method of such a device are well known in the art, so that detailed description thereof will be omitted herein.

DETAILED DESCRIPTION OF THE EMBODIMENTS

Figure 1:
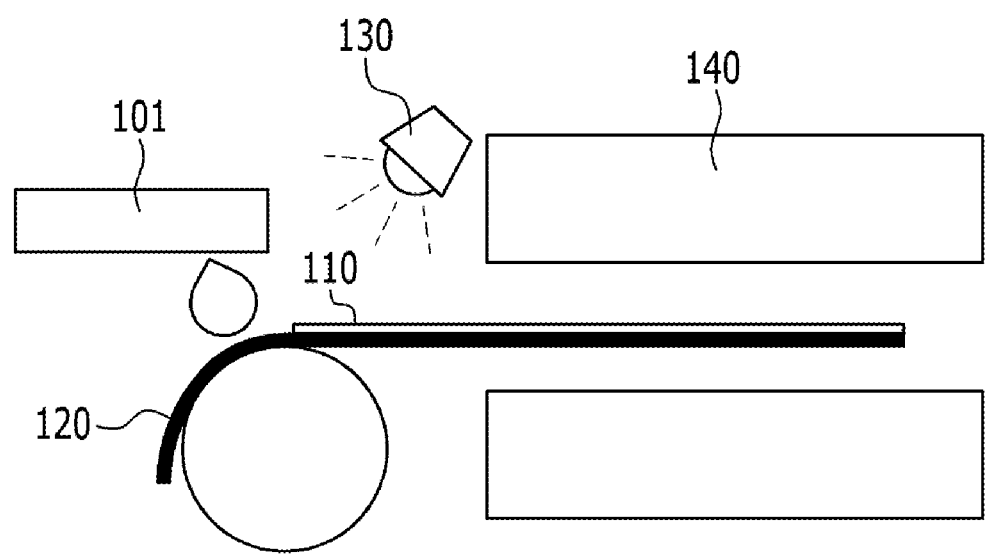
FIG. 1 is a schematic view illustrating an electrode manufacturing method according to an exemplary embodiment of the present invention.
Figure 2:
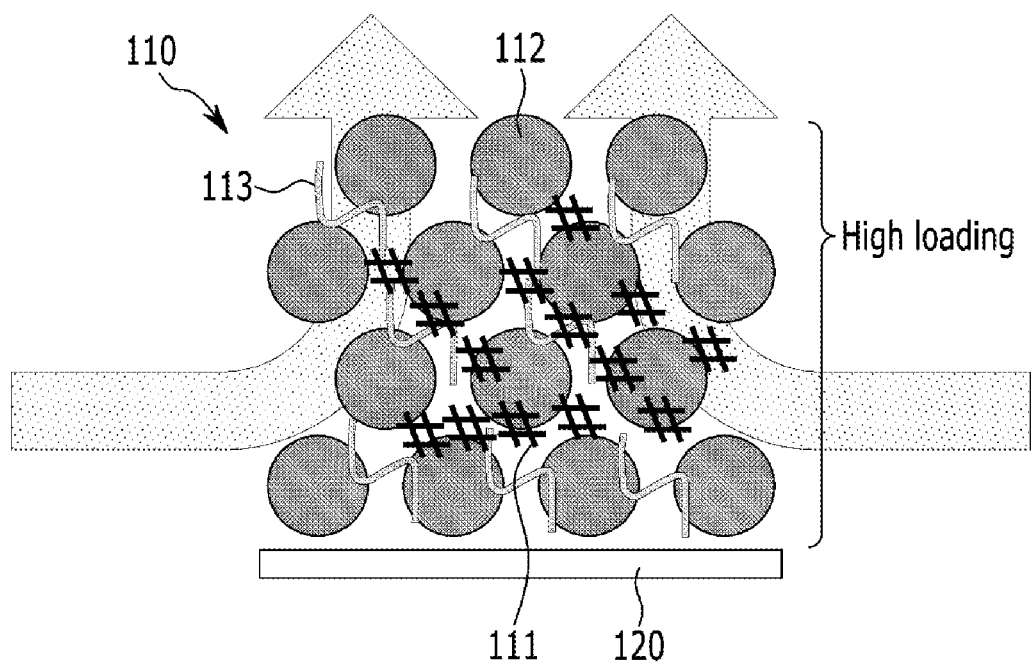
FIG. 2 is a schematic view illustrating a shape in a drying process of a secondary battery electrode according to an exemplary embodiment of the present invention.

Hereinafter, exemplary embodiments of the present invention will be described with reference to the drawings. However, the scope of the present invention is not limited by the exemplary embodiments of the present invention.

Example 1

1. Production of Negative Electrode

A bisphenol A-based acryl urethane (weight average molecular weight (Mw): 1000), a polydimethylsiloxane-based vinyl ether urethane (weight average molecular weight (Mw): 3000), and a photoinitiator (benzophenone) were mixed at a weight of 94.9:5:0.1, and the mixture to artificial graphite to carbon black to SBR were measured at a weight ratio of 4:93.5:1:1.5 and were mixed in water, to produce a negative electrode mixture slurry for producing a negative electrode mixture layer. It was coated on a copper foil with a thickness of 108 μm and was irradiated with ultraviolet rays having a wavelength of 250 to 400 nm for 240 seconds, and then it was dried and rolled to manufacture a negative electrode.

2. Production of Positive Electrode $Li(Ni_{1/3}Mn_{1/3}Co_{1/3})O_2$, carbon black, and PVdF were mixed at a weight ratio of 96:1.5:2.5 and were mixed in NMP to produce a positive electrode mixture slurry for producing a positive electrode mixture layer. Then, it was coated on an aluminum foil with a thickness of 80 μm and dried and rolled to manufacture a positive electrode.

Example 2

In Example 2, when a negative electrode slurry was produced, negative and positive electrodes were manufactured by a same method as in Example 1 except for a weight ratio of the mixture, artificial graphite, carbon black, and SBR which was 2:95:1:2.

Example 3

Carboxymethyl cellulose (weight average molecular weight (Mw)=90,000) dissolved in water and polyacrylic acid (weight average molecular weight (Mw)=100,000) dissolved in water were uniformly mixed (mixing molar ratio of carboxymethyl cellulose to polyacrylic acid=73.5:26.5), and the mixture, artificial graphite, carbon black, and SBR were measured at a weight ratio of 4:93.5:1:1.5 and were mixed in NMP to produce a negative electrode mixture slurry for producing a negative electrode mixture layer. Then, it was coated on a copper foil with a thickness of 100 μm, subjected to a first heat treatment at 90° C. and a second heat treatment at 200° C. under vacuum, and then rolled to manufacture a negative electrode. The positive electrode was manufactured in the same manner as in Example 1.

Example 4

In Example 4, when a negative electrode slurry was produced, negative and positive electrodes were manufactured by a same method as in Example 3 except for a weight ratio of a mixture, artificial graphite, carbon black, and SBR which was 2:95:1:2.

Comparative Example 1

In comparative Example 1, a negative electrode was manufactured by a same method as in Example 1 except that artificial graphite, carbon black, CMC, and SBR were measured at a weight ratio of 95:1:1:3 and were mixed with water, to produce a negative electrode mixture slurry for producing a negative electrode mixture layer, and then it was coated on a copper foil with a thickness of 100 μm and dried and rolled. A positive electrode was manufactured by a same method as in Example 1.

Experimental Example 1

Comparative Evaluation of Adhesion Property

A following experiment was conducted in order to evaluate an adhesive force of the electrode according to the present invention.

Each negative electrode manufactured in Examples 1 to 4 and Comparative Example 1 was put into a DMC electrolyte solution solvent, and then peel strengths from the collector were determined and are shown in Table 1.

TABLE 1

|  | 180° peel strength (gf/cm) | % |
| --- | --- | --- |
| Example 1 | 17.7 | 123% |
| Example 2 | 15.8 | 110% |
| Example 3 | 16.4 | 114% |
| Example 4 | 15.5 | 108% |
| Comparative Example 1 | 14.3 | 100% |

As shown in Table 1, it is seen that the negative electrode including the cross-linked polymer according to Examples 1 to 4 has a better adhesion property than the negative electrode which does not include the cross-linked polymer according to Comparative Example 1.

Particularly, it is seen that the negative electrode including a smaller content of binder according to Examples 2 and 4 has a better adhesion property than the negative electrode including a larger content of binder according to Comparative Example 1, and it is seen that the negative electrode including a large number of cross-linked polymers according to Example 1 and 3 has a similar adhesion property to the electrode according to Examples 2 and 4.

It is seen that the positive electrode and the negative electrode of Examples 1 and 2 using acryl urethane-based oligomer and siloxane-based vinyl ether urethane as a cross-linked polymer for the negative electrode have an excellent adhesion property as compared with Examples 3 and 4 using at least one other kind of polymer as the crosslinked polymer.

Experimental Example 2

Evaluation of Battery Life Characteristics

A polyethylene film (Celgard, thickness: 20 mm) was interposed as a separation film between the positive electrode and the negative electrode manufactured in Examples 1 to 4 and Comparative Example 1, and a battery cell was manufactured using an electrolytic solution in which 1 M LiPF$_6$ was dissolved in a mixed solution of EC, DMC, and EMC, and life characteristics thereof were evaluated. The life characteristics were evaluated under conditions of ⅓ C to ⅓ C (1 charge/discharge) between 4.2 V and 2.5 V. The life characteristics were evaluated from a discharge capacity retention rate, and the discharge capacity retention rate was expressed as a ratio of the capacity after the charge/discharge was repeated 200 times to an initial capacity thereof. The results are shown in Table 2.

TABLE

|  | Life characteristics | |
| --- | --- | --- |
|  | Initial discharge capacity | 100 times capacity retention |
| Example 1 | 100%, 59.1 mAh/g | 88.0 |
| Example 2 | 100%, 58.8 mAh/g | 86.3 |
| Example 3 | 100%, 59.0 mAh/g | 87.4 |
| Example 4 | 100%, 58.5 mAh/g | 85.0 |
| Comparative Example 1 | 100%, 59.6 mAh/g | 84.8 |

Referring to Table 2, it is seen that the life characteristics of the secondary battery using the electrode of the present invention are superior to those of the secondary battery using the electrode of Comparative Example 1. This is because the adhesion property between the electrode collector and the electrode mixture layer is improved as shown in Experimental Example 1.

It is seen that the negative electrode of Examples 1 and 2 using an acryl urethane-based oligomer and a siloxane-based vinyl ether urethane as cross-linked polymers for both the positive electrode and the negative electrode have an excellent adhesion property as compared with Examples 3 and 4 using at least one other kind of polymer as the crosslinked polymer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, the secondary battery electrode of the present invention may further include a cross-linked polymer in which the electrode mixture layer has an interpenetrating polymer network to uniformly distribute binders in the electrode mixture layer. Accordingly, even in the case of a secondary battery having high battery capacity, it is possible to secure the adhesive force between the collector and the electrode materials, thereby improving the overall performance of the battery, particularly the life characteristics.

The invention claimed is:

1. A secondary battery electrode comprising:
a current collector; and
an electrode mixture layer coated on the current collector,
wherein the electrode mixture layer includes an interpenetrating polymer network (IPN), an electrode active material, and a binder,
wherein the interpenetrating polymer network (IPN) having a first polymerization unit and a second polymerization unit, wherein a cross-linked bond exists between the first polymerization unit and the second polymerization unit, and
wherein the first polymerization unit is an acryl urethane-based oligomer, and the second polymerization unit is a vinyl ether urethane-based oligomer.

2. The secondary battery electrode of claim 1, wherein the acryl urethane-based oligomer are a bisphenol A-based acryl urethane, or a 6F bisphenol A-based acryl urethane.

3. The secondary battery electrode of claim 1, wherein a weight average molecular weight of the acryl urethane-based oligomer is in a range of 100 to 500,000.

4. The secondary battery electrode of claim 1, wherein the vinyl ether urethane-based oligomer is a siloxane-based vinyl ether urethane.

5. The secondary battery electrode of claim 4, wherein the siloxane-based vinyl ether urethane is a polydimethylsiloxane-based vinyl ether urethane.

6. The secondary battery electrode of claim 1, wherein a weight average molecular weight of the vinyl ether urethane-based oligomer or is in a range of 100 to 500,000.

7. The secondary battery electrode of claim 1, wherein the first polymerization unit and second polymerization unit are subjected to a cross-linking reaction at a weight ratio of 5:95 to 95:5 to form the cross-linked bond.

8. The secondary battery electrode of claim 1, wherein the IPN is contained in an amount of 0.1% by weight to 30% by weight based on a total weight of the electrode mixture layer.

9. A lithium secondary battery comprising a secondary battery electrode of claim 1.

10. A battery module comprising a lithium secondary battery of claim 9 as a unit battery.

* * * * *